United States Patent
Sunaga

(10) Patent No.: US 12,037,486 B2
(45) Date of Patent: Jul. 16, 2024

(54) POLYACETAL RESIN COMPOSITION, EXTRUSION-MOLDED ARTICLE, AND INJECTION-MOLDED ARTICLE

(71) Applicant: MITSUBISHI GAS CHEMICAL COMPANY, INC., Tokyo (JP)

(72) Inventor: Daisuke Sunaga, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 17/801,660

(22) PCT Filed: Mar. 3, 2021

(86) PCT No.: PCT/JP2021/008193
§ 371 (c)(1),
(2) Date: Aug. 23, 2022

(87) PCT Pub. No.: WO2021/182242
PCT Pub. Date: Sep. 16, 2021

(65) Prior Publication Data
US 2023/0151203 A1 May 18, 2023

(30) Foreign Application Priority Data
Mar. 12, 2020 (JP) ................. 2020-042784

(51) Int. Cl.
| | |
|---|---|
| *C08L 59/00* | (2006.01) |
| *B29C 45/00* | (2006.01) |
| *B29C 48/00* | (2019.01) |
| *C08K 3/26* | (2006.01) |
| *C08K 5/10* | (2006.01) |
| *C08K 5/20* | (2006.01) |
| *C08L 23/06* | (2006.01) |
| *B29K 59/00* | (2006.01) |

(52) U.S. Cl.
CPC .......... *C08L 59/00* (2013.01); *B29C 45/0001* (2013.01); *B29C 48/022* (2019.02); *C08K 3/26* (2013.01); *C08K 5/10* (2013.01); *C08K 5/20* (2013.01); *C08L 23/06* (2013.01); *B29K 2059/00* (2013.01); *C08K 2003/267* (2013.01); *C08L 2207/066* (2013.01)

(58) Field of Classification Search
CPC ........... C08L 59/00; C08L 23/06; C08K 5/20; C08K 3/26; C08K 5/10; B29C 45/0001; B29C 48/022
See application file for complete search history.

(56) References Cited

U.S. PATENT DOCUMENTS

| | | | |
|---|---|---|---|
| 4,675,356 A | 6/1987 | Miyata | |
| 6,147,146 A | 11/2000 | Horio et al. | |
| 6,753,363 B1 | 6/2004 | Harashima | |
| 2013/0324675 A1* | 12/2013 | Luo | ........................ C08L 83/08 525/398 |

FOREIGN PATENT DOCUMENTS

| | | |
|---|---|---|
| JP | S61-174270 A | 8/1986 |
| JP | 3087911 B2 | 9/2000 |
| JP | 2004-149670 A | 5/2004 |
| JP | 2017-165835 A | 9/2017 |
| JP | 2019-65221 A | 4/2019 |
| WO | S57-192448 A | 11/1982 |
| WO | WO 98/21280 A1 | 5/1998 |
| WO | WO 01/05888 A1 | 1/2001 |
| WO | WO 2021/251189 A1 | 12/2021 |

OTHER PUBLICATIONS

ISR for PCT/JP2021/008193, dated May 18, 2021.
Notice of Reasons for Refusal for JP App. No. 2021-533619, mailed Sep. 28, 2021 (w/ translation).
Notice of Reasons for Refusal for JP App. No. 2021-533619, mailed Jan. 18, 2022 (w/ translation).
Decision to Grant a Patent for JP App. No. 2021-533619, mailed Jun. 7, 2022 (w/ translation).

* cited by examiner

*Primary Examiner* — John E Uselding
(74) *Attorney, Agent, or Firm* — GREENBLUM & BERNSTEIN, P.L.C.

(57) ABSTRACT

The present invention provides a polyacetal resin composition, which comprises a polyacetal resin, and which further comprises the following (A), (B) and (C), with respect to 100 parts by weight of the polyacetal resin: (A) 0.05 to 5.5 parts by weight of a low-density polyethylene having a melt flow rate of 1.0 to 50 g/10 minutes (190° C., 2.16 kg), (B) 0.05 to 2.0 parts by weight of a fatty acid compound (excluding calcium stearate), and (C) 0.001 to 1.0 part by weight of a layered double hydroxide represented by the following general formula (1): $[(M^{2+})_x(M^{3+})_y(OH)_{2(x+y)}](A^{n-})_{x/n} \cdot (H_2O)$ (1) (wherein, in the general formula (1), $M^{2+}$ represents a divalent metal ion, $M^{3+}$ represents a trivalent metal ion, $A^{n-}$ represents an n-valent anion, wherein one or more of the anions are contained in the layered double hydroxide, x represents a number in the range of $0 < x \leq 6.0$, n represents 1, 2, or 3, and y and z each represent a number of 0 or greater).

2 Claims, No Drawings

POLYACETAL RESIN COMPOSITION, EXTRUSION-MOLDED ARTICLE, AND INJECTION-MOLDED ARTICLE

TECHNICAL FIELD

The present invention relates to a polyacetal resin composition, and an extrusion-molded product and an injection-molded product, each comprising the polyacetal resin composition.

BACKGROUND ART

Polyacetal resin is an engineering plastic excellent in terms of balance of mechanical properties, and in general, it is used as a material for the cutting processing of, what is called, round bars or plates. Such polyacetal resin has high crystallinity, and the shrinkage thereof is relatively large upon consolidation. Thus, when the polyacetal resin is melted and a material for cutting processing is then molded therefrom, voids that are unfavorable for mechanical properties, or whitening that is unfavorable for appearance may be generated inside the molded product in some cases.

Japanese Patent No. 3087911 discloses a polyoxymethylene resin composition formed by mixing 0.05 to 2 parts by weight of hindered phenol, 0.01 to 5 parts by weight of low-density polyethylene having a melt index of 0.2 to 100 g/10 minutes, 0.01 to 1.0 part by weight of fatty acid calcium salt containing 10 to 36 carbon atoms, which has 50 ppm by weight or less of calcium ions and 100 ppm by weight or less of chloride ions, and 0 to 2.0 parts by weight of at least one type of formaldehyde-reactive substance selected from the group consisting of an unpolymerized compound having formaldehyde-reactive nitrogen atoms and a polymer having formaldehyde-reactive nitrogen atoms, with respect to 100 parts by weight of a polyoxymethylene resin, wherein the polyoxymethylene resin composition is excellent in terms of extrusion moldability, and the biting of the resin composition into the screw of an extruding machine is favorable during extrusion molding, and extrusion-molded products excellent in terms of physical properties and appearance, which have a very few whitened parts or nest parts consisting of microvoids and the like, can be obtained.

Japanese Patent Application (Kokai) No. 2004-149670 A discloses a polyacetal resin composition for use in extrusion molding, comprising 0.1 to 5 parts by weight of a copolymer of polyethylene or ethylene and an acrylic compound, 0.01 to 5 parts by weight of sterically hindered phenol, 0.01 to 7 parts by weight of an amine-substituted triazine compound, and 0.004 to 5 parts by weight of at least one type of metal-containing compound selected from the hydroxide, inorganic salt or alkoxide of an alkali metal or an alkaline-earth metal, with respect to 100 parts by weight of a polyacetal resin, and having a melt index of 1.0 to 30.0 g/10 minutes, wherein the polyacetal resin composition is excellent in terms of extrusion moldability, and in particular, the polyacetal resin composition is able to reduce voids or whitening generated in the center portion thereof during extrusion molding, and in particular, generation of whitening that is unfavorable in appearance.

SUMMARY OF INVENTION

Technical Problem

A molded product produced using a conventional polyacetal resin composition is problematic in terms of an increase in the melt flow rate thereof compared with the melt flow rate of the polyacetal resin composition (i.e. a problem regarding viscosity reduction), poor appearance caused by whitening occurring around the internal central axis of the product (a problem regarding a white core), and poor appearance of undulation generated on the surface (a problem regarding undulation unevenness).

Hence, an objective of the present invention is to provide: a polyacetal resin composition, with which a molded product that overcomes or reduces the aforementioned problems can be produced; and an extrusion-molded product and an injection-molded product, both of which are produced using the above-described polyacetal resin composition.

Means of Solving the Problems

The present invention includes the following aspects.

[1]

A polyacetal resin composition comprising a polyacetal resin, wherein the polyacetal resin composition further comprises the following (A), (B) and (C), with respect to 100 parts by weight of the polyacetal resin:

(A) 0.05 to 5.5 parts by weight of a low-density polyethylene having a melt flow rate of 1.0 to 50 g/10 minutes (190° C., 2.16 kg).

(B) 0.05 to 2.0 parts by weight of a fatty acid compound (excluding calcium stearate), and (C) 0.001 to 1.0 part by weight of a layered double hydroxide represented by the following general formula (1):

$$[(M^{2+})_x(M^{3+})_y(OH)_{2(x+y)}](A^{n-})_{x/n} \cdot z(H_2O) \qquad (1)$$

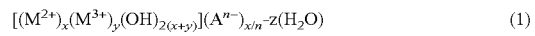

wherein $M^{2+}$ represents a divalent metal ion, $M^{3+}$ represents a trivalent metal ion, $A^{n-}$ represents an n-valent anion, wherein one or more of the anions are contained in the layered double hydroxide, x represents a number in the range of $0 < x \leq 6.0$, n represents 1, 2, or 3, and y and z each represent a number of 0 or greater.

[2]

The polyacetal resin composition according to the above [1], wherein the low-density polyethylene is a linear low-density polyethylene having a melt flow rate of 3.0 to 50 g/10 minutes (190° C., 2.16 kg).

[3]

The polyacetal resin composition according to the above [1] or [2], wherein the fatty acid compound is a fatty acid ester, a fatty acid amide, or a combination thereof, wherein the fatty acid ester is selected from the group consisting of stearyl stearate, behenyl behenate, pentaerythritol distearate, and pentaerythritol tetrastearate, and the fatty acid amide is selected from the group consisting of ethylenebis(stearamide), ethylenebis(oleamide), stearic acid monoamide, and oleic acid monoamide.

[4]

The polyacetal resin composition according to any one of the above [1] to [3], wherein the layered double hydroxide is hydrotalcite.

[5]

The polyacetal resin composition according to the above [4], wherein the hydrotalcite is a compound, in which, in the general formula (1), $M^{2+}$ is $Mg^{2+}$, $M^{3+}$ is $Al^{3+}$, and $A^{n-}$ is $CO_3^{2-}$ and/or $OH^-$.

[6]
A polyacetal resin composition comprising a polyacetal resin, wherein
the polyacetal resin composition further comprises the following (A), (B) and (C), with respect to 100 parts by weight of the polyacetal resin:
(A) 0.1 to 5.0 parts by weight of a low-density polyethylene having a melt flow rate of 3.0 to 50 g/10 minutes (190° C., 2.16 kg),
(B) 0.1 to 1.0 part by weight of a fatty acid compound (excluding calcium stearate), and
(C) 0.005 to 0.1 parts by weight of hydrotalcite, wherein the fatty acid compound is a fatty acid ester, a fatty acid amide, or a combination thereof, wherein
the fatty acid ester is selected from the group consisting of stearyl stearate, behenyl behenate, pentaerythritol distearate, and pentaerythritol tetrastearate, and
the fatty acid amide is selected from the group consisting of ethylenebis(stearamide), ethylenebis(oleamide), stearic acid monoamide, and oleic acid monoamide.

[7]
The polyacetal resin composition according to any one of the above [1] to [6], wherein the melt flow rate of the polyacetal resin composition is 1.0 to 5.0 g/10 minutes (190° C., 2.16 kg).

[8]
An extrusion-molded product comprising the polyacetal resin composition according to any one of the above [1] to [7].

[9]
An injection-molded product comprising the polyacetal resin composition according to any one of the above [1] to [7].

Advantageous Effects of Invention

By using the polyacetal resin composition of the present invention, the problems of a molded product, namely, viscosity reduction, a white core, and undulation unevenness generated on the surface thereof can be overcome or reduced.

DESCRIPTION OF EMBODIMENTS

Polyacetal Resin Composition
The polyacetal resin composition of the present invention comprises a polyacetal resin, and further comprises the following (A), (B) and (C), with respect to 100 parts by weight of the polyacetal resin:
(A) 0.05 to 5.5 parts by weight of a low-density polyethylene having a melt flow rate of 1.0 to 50 g/10 minutes (190° C. 2.16 kg),
(B) 0.05 to 2.0 parts by weight of a fatty acid compound (excluding calcium stearate), and
(C) 0.001 to 1.0 part by weight of a layered double hydroxide represented by the following general formula (1):

$$[(M^{2+})_x(M^{3+})_y(OH)_{2(x+y)}](A^{n-})_{x/n} \cdot z(H_2O) \tag{1}$$

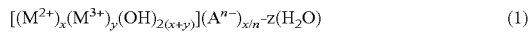

wherein $M^{2+}$ represents a divalent metal ion, $M^{3+}$ represents a trivalent metal ion, $A^{n-}$ represents an n-valent anion, wherein one or more of the anions are contained in the layered double hydroxide, x represents a number in the range of $0 < x \leq 6.0$, n represents 1, 2, or 3, and y and z each represent a number of 0 or greater.

The polyacetal resin composition can be prepared by adding the additives (A) to (C) (as necessary, other additives) to the polyacetal resin, and then blending and/or kneading the mixture of the polyacetal resin and the additives (A) to (C). The blending and/or kneading method is not particularly limited, and a method of using a known blending and/or kneading machine can be applied. The kneading is preferably carried out at a temperature at which the polyacetal resin is melted, or higher, and specifically, at the melting temperature of the polyacetal resin as a raw material, or higher (in general, at 180° C. or higher). For example, with regard to the polyacetal resin composition, the additives (A) to (C) may be added to the polyacetal resin, and they may be blended with one another using a tumbler-type blender, etc. Thereafter, the obtained mixture may be melted and kneaded using a single-screw or twin-screw extruder, so that the mixture may be extruded in a strand form, and may be then pelletized. Upon the pelletizing of the polyacetal resin composition, in order to adjust the melt flow rate of the pellets of the polyacetal resin composition, the amount of a chain-transfer agent added may be adjusted.

The polyacetal resin composition has a melt flow rate of 1.0 to 5.0 g/10 minutes (190° C., 2.16 kg), which is measured in accordance with ISO1133 Standards. When the melt flow rate of the polyacetal resin composition is smaller than 1.0 g/10 minutes (190° C. 2.16 kg), a heavy load is imposed on the extrusion molding machine and the injection molding machine upon the molding thereof, and shear heating also becomes large, so that thermal decomposition easily occurs. Besides, when the melt flow rate of the polyacetal resin composition is greater than 30 g/10 minutes (190° C., 2.16 kg), a back flow is easily generated in an extruder due to a back pressure upon the molding, and moldability thereby decreases.

The polyacetal resin composition is subjected to extrusion molding or injection molding, so that it can be used to produce molded products having various shapes such as bar-shaped and plate-shaped products. After completion of the molding, the molded product can be directly used as a product, or the molded product is further subjected to processing such as cutting processing, so that it can be used to produce various types of components, etc. For example, using the polyacetal resin composition, a bar-shaped molded product having a diameter of 10 to 200 mm, a plate-shaped molded product having a thickness of 10 to 100 mm, etc. can be produced.

The polyacetal resin composition of the present invention is excellent in terms of extrusion moldability and injection moldability, and thus, the present polyacetal resin composition overcomes or reduces problems regarding viscosity reduction, a white core, and unevenness occurring on the surface. When compared with conventional polyacetal resin compositions, the polyacetal resin composition of the present invention overcomes or reduces the problem regarding viscosity reduction, so that discharge speed and production stability are improved upon the molding, and the problems regarding a white core and unevenness on the surface are overcome or reduced, and as a result, the reliability of physical properties and the appearance of the molded product are improved.

Polyacetal Resin
The polyacetal resin comprised in the polyacetal resin composition is a polymer having an acetal bond (—O—CRH— (wherein R represents a hydrogen atom or an organic group)) in a repeating unit thereof, and in general, the polyacetal resin has an oxymethylene group (—OCH$_2$—), in which R is a hydrogen atom, as a principal constituting unit. The polyacetal resin may be a copolymer (a block copolymer) or a terpolymer, which comprises one or more types of constitutional repeating units, other than the oxymethylene group. The polyacetal resin may have a linear structure, and may also have a branched structure or a crosslinked structure, in which a glycidyl ether compound, an epoxy compound, an allyl ether compound or the like is used as a comonomer and/or a termonomer.

The constitutional units other than the oxymethylene group is an optionally branched oxyalkylene group containing 2 to 10 carbon atoms, such as an oxyethylene group (—OCH$_2$CH$_2$— or —OCH(CH$_3$)—), an oxypropylene group (—OCH$_2$CH$_2$CH$_2$—, —OCH(CH$_3$)CH$_2$—, or —OCH$_2$CH(CH$_3$)—), or an oxybutylene group (—OCH$_2$CH$_2$CH$_2$CH$_2$—, —OCH(CH$_3$)CH$_2$CH$_2$—, —OCH$_2$CH(CH$_3$)CH$_2$—, —OCH$_2$CH$_2$CH(CH$_3$)—, —OCH(C$_2$H$_5$)CH$_2$—, or —OCH$_2$CH(C$_2$H$_5$)—). Preferably, the constitutional unit other than the oxymethylene group may be an optionally branched oxyalkylene group containing 2 to 4 carbon atoms, or an oxyethylene group (—OCH$_2$CH$_2$—). In addition, the content of the constitutional units other than the oxymethylene group (i.e. an oxyalkylene group) in the polyacetal resin is 0.1% to 20% by weight, preferably 0.5% to 15% by weight, and more preferably 0.5% to 6.0% by weight.

The method for producing the polyacetal resin is not particularly limited, and the polyacetal resin may be produced according to a known method. For example, as a method for producing a polyacetal resin comprising, as constitutional units, an oxymethylene group and an oxyalkylene group containing 2 to 4 carbon atoms, a cyclic acetal comprising an oxymethylene group, such as a trimer (trioxane) or a tetramer (tetraoxane) of formaldehyde, is copolymerized with a cyclic acetal comprising an oxyalkylene group containing 2 to 5 carbon atoms, such as ethylene oxide, 1,3-dioxolane, 1,3,6-trioxocane or 1,3-dioxepane, so as to produce the aforementioned polyacetal resin.

(A) Low-Density Polyethylene (A) Low-density polyethylene comprised in the polyacetal resin composition is high-pressure low-density polyethylene (LDPE, density: 0.910 to 0.930 g/cm$^3$) or linear low-density polyethylene (LLDPE, density: 0.910 to 0.925 g/cm$^3$), and has a melt flow rate of 1.0 to 50 g/10 minutes, which is measured in accordance with ISO1133 Standards (190° C., 2.16 kg). Preferably, the low-density polyethylene has a melt flow rate (190° C., 2.16 kg) of 3.0 to 50 g/10 minutes, 3.6 to 50 g/10 minutes, 1.0 to 45 g/10 minutes, 3.0 to 45 g/10 minutes, 3.6 to 45 g/10 minutes, 10 to 45 g/10 minutes, 15 to 45 g/10 minutes, 20 to 45 g/10 minutes, 22 to 45 g/10 minutes, 3.0 to 40 g/10 minutes, 3.0 to 30 g/10 minutes, 3.0 to 25 g/10 minutes, 3.6 to 22 g/10 minutes, 10 to 30 g/10 minutes, 20 to 25 g/10 minutes, or 21 to 23 g/10 minutes. As such low-density polyethylene, a combination of LDPE with LLDPE may also be used.

(A) Low-density polyethylene is comprised in the polyacetal resin composition, in an amount of 0.05 to 5.5 parts by weight with respect to 100 parts by weight of the polyacetal resin. (A) Low-density polyethylene is comprised in the polyacetal resin composition, preferably in an amount of 0.05 to 5.0 parts by weight. 0.05 to 3.0 parts by weight, 0.05 to 2.0 parts by weight, 0.1 to 5.0 parts by weight, 0.1 to 3.0 parts by weight. 0.1 to 2.0 parts by weight, 1.0 to 5.5 parts by weight, 1.0 to 5.0 parts by weight, 1.0 to 3.0 parts by weight, or 1.0 to 2.0 parts by weight, and more preferably in an amount of 0.1 to 5.0 parts by weight, with respect to 100 parts by weight of the polyacetal resin.

(B) Fatty Acid Compound (B) Fatty acid compound (excluding calcium stearate) comprised in the polyacetal resin composition is a fatty acid ester, a fatty acid amide, or a combination thereof. The fatty acid ester is selected from the group consisting of stearyl stearate, behenyl behenate, pentaerythritol distearate, and pentaerythritol tetrastearate. The fatty acid amide is selected from the group consisting of ethylenebis(stearamide), ethylenebis(oleamide), stearic acid monoamide, and oleic acid monoamide.

(B) Fatty acid compound is comprised in the polyacetal resin composition, in an amount of 0.05 to 2.0 parts by weight with respect to 100 parts by weight of the polyacetal resin. (B) Fatty acid compound is comprised in the polyacetal resin composition, preferably in an amount of 0.05 to 1.5 parts by weight, 0.05 to 1.0 parts by weight, 0.1 to 2.0 parts by weight, 0.1 to 1.5 parts by weight, 0.1 to 1.0 part by weight, 0.3 to 2.0 parts by weight. 0.3 to 1.5 parts by weight, or 0.1 to 1.0 part by weight, and more preferably in an amount of 0.1 to 1.0 part by weight, with respect to 100 parts by weight of the polyacetal resin.

(C) Layered Double Hydroxide (C) Layered double hydroxide comprised in the polyacetal resin composition is a compound with a metal hydroxide layer, which has anion exchange capacity, and this compound is represented by the following general formula (1):

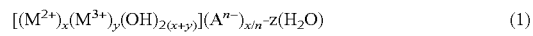

$$[(M^{2+})_x(M^{3+})_y(OH)_{2(x+y)}](A^{n-})_{x/n} \cdot z(H_2O) \tag{1}$$

wherein $M^{2+}$ represents a divalent metal ion, $M^{3+}$ represents a trivalent metal ion, $A^{n-}$ represents an n-valent anion, wherein one or more of the anions are contained in the layered double hydroxide, x represents a number in the range of $0 < x \leq 6.0$, n represents 1, 2, or 3, and y and z each represent a number of 0 or greater.

The divalent metal ion ($M^{2+}$) is an alkaline-earth metal ion ($Mg^{2+}$, etc.), $Mn^{2+}$, $Fe^{2+}$, $Co^{2+}$, $Ni^{2+}$, $Cu^{2+}$, or $Zn^{2+}$. The trivalent metal ion ($M^{3+}$) is $Al^{3+}$, $Fe^{3+}$, $Cr^{3+}$, $Co^{3+}$, or $In^{3+}$. The n-valent anion ($A^{n-}$) is $OH^-$, $F^-$, $Cl^-$, $Br^-$, $NO_3^-$, $CO_3^{2-}$, $SO_4^{2-}$, $Fe(CN)_6^{3-}$, $CH_3COO^-$, an oxalate ion, or a salicylate ion.

The layered double hydroxide is preferably hydrotalcite. The hydrotalcite is a compound, in which, in the above general formula (1), the divalent metal ion ($M^{2+}$) is an alkaline-earth metal ion, the trivalent metal ion ($M^{3+}$) is $Al^{3+}$, and the n-valent anion ($A^{n-}$) is $CO_3^{2-}$ and/or $OH^-$. Furthermore, among such hydrotalcite compounds, a compound, in which, in the above general formula (1), the divalent metal ion ($M^{2+}$) is $Mg^{2+}$, the trivalent metal ion ($M^{3+}$) is $Al^3$, and the n-valent anion ($A^{n-}$) is $CO_3^{2-}$ and/or $OH^-$, is preferable.

Examples of the hydrotalcite may include: natural hydrotalcite represented by $Mg_{1.5}Al_{0.5}(OH)_4(CO_3)_{0.75} \cdot 1.0H_2O$); and synthetic hydrotalcite represented by $Mg_{4.5}Al_2(OH)_{13}CO_3 \cdot 1.5H_2O$. For example, as such hydrotalcite, Hycite 713 ($Mg_4Al_2(OH)_{12}CO_3 \cdot 1.5H_2O$) manufactured by Clariant Chemicals K.K. can be used.

(C) Layered double hydroxide is comprised in the polyacetal resin composition, in an amount of 0.001 to 1.0 part by weight with respect to 100 parts by weight of the polyacetal resin. (C) Layered double hydroxide is comprised in the polyacetal resin composition, preferably in an amount of 0.001 to 0.8 parts by weight, 0.001 to 0.5 parts by weight, 0.001 to 0.2 parts by weight. 0.001 to 0.1 parts by weight, 0.005 to 0.8 parts by weight, 0.005 to 0.5 parts by weight, 0.005 to 0.2 parts by weight, 0.005 to 0.1 parts by weight, 0.01 to 0.8 parts by weight, 0.01 to 0.5 parts by weight, 0.01 to 0.2 parts by weight, or 0.01 to 0.1 parts by weight, and more preferably in an amount of 0.005 to 0.1 parts by weight, with respect to 100 parts by weight of the polyacetal resin.

Other Additives

The polyacetal resin composition of the present invention may further comprise sterically hindered phenol and/or a nitrogen-containing compound, in a range in which these compounds do not impair the purpose of the present invention. By allowing the present polyacetal resin composition to further comprise sterically hindered phenol and/or a nitrogen-containing compound, the heat stability of the polyacetal resin composition is improved. Otherwise, the sterically hindered phenol that does not have an ester group in the molecule thereof can suppress the oxidative decomposition of hemiformal end groups originally contained in the polyacetal resin and hemiformal end groups generated as a result of the hydrolysis of formic acid ester end groups.

The sterically hindered phenol is generally used as an antioxidant. Examples of the sterically hindered phenol may include 1,3,5-trimethyl-2,4,6-tris(3,5-di-t-butyl-4-hydroxybenzyl)benzene (manufactured by BASF, Irganox 1330(registered trademark)), ethylenebis(oxyethylene)bis-(3-5-t-butyl-4-hydroxyl-m-tolyl)propionate) (manufactured by BASF, Irganox 245(registered trademark)), 1,1,3-tris(2-methyl-4-hydroxy-5-t-butylphenyl)butane (manufactured by ADEKA, AO-30), triethylene glycol-bis-3-(3-t-butyl-4-hydroxy-5-methylphenyl)propionate, pentaerythrityl-tetrakis-3-(3,5-di-t-butyl-4-hydroxyphenyl)propionate, and 1,6-hexanediol-bis[3-(3,5-di-t-butyl-4-hydroxyphenyl) propionate]. These sterically hindered phenols may be used alone as a single type, or in combination of two or more types.

The content of the sterically hindered phenol in the polyacetal resin composition is not limited, and the sterically hindered phenol may be comprised in the polyacetal resin composition, in an amount of 0.01 to 10 parts by weight, 0.1 to 2.0 parts by weight, 0.1 to 1.0 part by weight, or 0.2 to 0.4 parts by weight, with respect to 100 parts by weight of the polyacetal resin. When the content of the sterically hindered phenol (D) is 0.01 parts by weight or more, the beat stability of the polyacetal resin composition is improved, and when the content of the sterically hindered phenol is 10 parts by weight or less, heat stability is improved without involving significant mold contamination.

The nitrogen-containing compound is, for example, an amino-substituted triazine compound. Examples of the amino-substituted triazine compound may include: methylol melamines, such as guanamine, melamine, N-butylmelamine, N-phenylmelamine, N,N-diphenylmelamine, N,N-diallylmelamine, N,N',N"-triphenylmelamine, and N,N',N"-trimethylol melamine; alkylated melamines, such as hexamethoxymethylmelamine; and benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine. 2,4-diamino-6-mercapto-sym-triazine, and ameline (N,N,N',N'-tetracyanoethylbenzoguanamine). Among these, melamine, methylol melamine, alkylated melamine, benzoguanamine, or a water-soluble melamine-formaldehyde resin is preferable. The above-described amino-substituted triazine compounds may be used alone as a single type, or in combination of two or more types. These amino-substituted triazine compounds are used as heat stabilizers.

The content of the nitrogen-containing compound in the polyacetal resin composition is not limited, and it is 0.01 to 5.0 parts by weight, 0.01 to 3.0 parts by weight, 0.02 to 2.0 parts by weight, 0.05 to 1.0 parts by weight, or 0.1 to 1.0 part by weight, with respect to 100 parts by weight of the polyacetal resin. When the content of the nitrogen-containing compound is 0.01 part by weight or more, the heat stability of the polyacetal resin composition is improved. On the other hand, when the content of the nitrogen-containing compound is 5.0 parts by weight or less, heat stability is improved without involving a significant reduction in tensile elongation or impact resistance.

EXAMPLES

Hereinafter, examples of the present invention will be described. Materials and the like used in the following examples and comparative examples will be described below.

Polyacetal Resin

A polyacetal resin prepared by the following method was used in Examples and Comparative Examples described below. Specifically, while 100 parts by weight of trioxane; 4 parts by weight of 1,3-dioxolane: boron trifluoride diethyl etherate used as a catalyst, in an amount of 0.05 mmol with respect to 1 mol of all monomers (i.e. trioxane and 1,3-dioxolane), in the form of a benzene solution; and methylal used as a molecular weight adjuster, in an amount of 500 ppm with respect to all monomers, in the form of a benzene solution, were continuously added to a biaxial continuous polymerization machine having self-cleaning paddle with a jacket set at a temperature of 65° C., polymerization is carried out, so as to prepare a polyacetal resin.

(A) Low-Density Polyethylene

The following substances were used as (A) low-density polyethylenes in Examples and Comparative Examples below.

MFR0.5: R500 (manufactured by Ube-Maruzen Polyethylene Co., Ltd.; melt flow rate: 0.5 g/10 minutes; density: 0.922 g/cm$^3$)

MFR3.6: NOVATEC LD LC520 (manufactured by Japan Polyethylene Corporation; melt flow rate: 3.6 g/10 minutes; density: 0.923 g/cm$^3$)

MFR22: NOVATEC LD LJ803 (manufactured by Japan Polyethylene Corporation; melt flow rate: 22 g/10 minutes; density: 0.921 g/cm$^3$)

MFR45: NOVATEC LD LJ902 (manufactured by Japan Polyethylene Corporation: melt flow rate: 45 g/10 minutes; density: 0.915 g/cm$^3$)

MFR60: J6016 (manufactured by Ube-Maruzen Polyethylene Co., Ltd.; melt flow rate: 60 g/10 minutes; density: 0.916 g/cm$^3$)

(B) Fatty Acid Compound

The following substances were used as (B) fatty acid compounds in Examples and Comparative Examples below.

B-1: Ethylene-bis-stearamide (KAO WAX EB-FF, manufactured by Kao Chemicals)

B-2: Stearyl stearate (EXCEPARL SS, manufactured by Kao Chemicals)

B-3: Calcium stearate (manufactured by NOF CORPORATION)

(C) Layered Double Hydroxide

The following substance was used as (C) layered double hydroxide in Examples and Comparative Examples below.

C: Hydrotalcite (Hycite 713, manufactured by Clariant Chemicals K.K.)

Preparation of Polyacetal Resin Composition and Production of Round Bar Molded Product Thereof To 100 parts by weight of the polyacetal resin, the additives (A) to (C) shown in Table 1 below were each added, in the amounts (part by weight) shown in Table 1. Further. 0.3 parts by weight of sterically hindered phenol (Irganox 245(registered trademark), manufactured by BASF) and 0.1 part by weight of melamine (manufactured by Mitsui Chemicals, Inc.) were added to the polyacetal resin, and the obtained mixture was then blended using a Henschel mixer. It is to be noted that the additive amounts of the sterically hindered phenol and the melamine were set to be the same in all of Examples and Comparative Examples. Subsequently, using a twin-screw extruder, while the mixture was heated and melted in the temperature range of 210° C. to 230° C., devolatilization was carried out at a reduced pressure of 21.3 kPa, so as to prepare pellets of a polyacetal resin composition. It is to be noted that, in Examples 1, 10, and 11, in order to adjust the melt flow rate of the prepared pellets of the polyacetal resin composition, dimethoxymethane was added as a chain-transfer agent during the polymerization. The additive amount of the chain-transfer agent was set at 250 ppm in Example 1, 120 ppm in Example 10, and 450 ppm in Example 11.

The obtained pellets of the polyacetal resin composition were used as raw materials, and a solid extrusion molding machine, in which a cooling die (100 mmϕ round bar, length: 600 mm) was equipped into the head of a no-vent-type 40 mmϕ monoaxial extruder (manufactured by Ikegai Corp., model: VS-40), was employed, and thereby, a 100 mmϕ round bar molded product was produced under conditions of a cylinder temperature of 180 to 195° C., a die temperature of 195° C., a die cooling temperature of 30° C., a resin pressure of 30 to 35 kg/cm$^2$, and an extrusion speed of 4.0 mm/minute.

It is to be noted that the polyacetal resin compositions of Examples 1 to 13 and Comparative Examples 1 to 10, and the round bar molded products thereof, were all prepared by the same method and under the same conditions, except for the types and additive amounts of the additive (A) to (C) shown in Table 1. Besides, Comparative Example 6 is an example in which the additive (B) was not added; Comparative Examples 7 to 9 are examples in which the additive (A) was not added; and Comparative Example 10 is an example in which the additive (C) was not added.

The round bar molded products of Examples 1 to 13 and Comparative Examples 1 to 10 were evaluated or measured, in terms of the degree of whitening, undulation unevenness, and ΔMFR before and after extrusion. The results are shown in Table 1.

[Table 1]

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| Low-density polyethylene (A) | MFR | g/10 min | 22 | 22 | 22 | 22 | 22 | 45 | 3.6 |
|  | Amount | part by weight | 0.1 | 1.0 | 5.0 | 1.0 | 1.0 | 1.0 | 1.0 |
| Fatty acid Compound (B-1) | Amount | part by weight | 0.3 | 0.3 | 0.3 | 0.1 | 1.0 | 0.3 | 0.3 |
| Fatty acid Compound (B-2) | Amount | part by weight |  |  |  |  |  |  |  |
| Fatty acid Compound (B-3) | Amount | part by weight |  |  |  |  |  |  |  |
| Layered double hydroxide (C) | Amount | part by weight | 0.01 | 0.01 | 0.01 | 0.01 | 0.01 | 0.01 | 0.01 |
| Pellet MFR |  | g/10 min. | 2.5 | 2.5 | 2.5 | 2.5 | 2.5 | 2.5 | 2.5 |
| Degree of whitening | Appearance Evaluation 1-4 |  | 2 | 1 | 1 | 1 | 1 | 1 | 1 |
| Undulation unevenness |  | μm | 7 | 4 | 9 | 7 | 3 | 5 | 4 |
| ΔMFR before and after extrusion |  | g/10 min. | 0.5 | 0.5 | 0.4 | 0.6 | 0.3 | 0.5 | 0.5 |

|  |  |  | Ex. 8 | Ex. 9 | Ex. 10 | Ex. 11 | Ex. 12 | Ex. 13 |
|---|---|---|---|---|---|---|---|---|
| Low-density polyethylene (A) | MFR | g/10 min | 22 | 22 | 22 | 22 | 22 | 22 |
|  | Amount | part by weight | 1.0 | 1.0 | 1.0 | 1.0 | 1.0 | 1.0 |
| Fatty acid Compound (B-1) | Amount | part by weight | 0.3 | 0.3 | 0.3 | 0.3 |  |  |
| Fatty acid Compound (B-2) | Amount | part by weight |  |  |  |  | 0.1 | 0.3 |
| Fatty acid Compound (B-3) | Amount | part by weight |  |  |  |  |  |  |
| Layered double hydroxide (C) | Amount | part by weight | 0.005 | 0.1 | 0.01 | 0.01 | 0.01 | 0.01 |

TABLE 1-continued

| | | | | | | | |
|---|---|---|---|---|---|---|---|
| Pellet MFR | g/10 min. | 2.5 | 2.5 | 1.1 | 4.5 | 2.5 | 2.5 |
| Degree of whitening | Appearance Evaluation | 1 | 1 | 1 | 1 | 2 | 1 |
| Undulation unevenness | μm | 5 | 4 | 4 | 4 | 8 | 6 |
| ΔMFR before and after extrusion | g/10 min. | 0.9 | 0.3 | 0.2 | 0.6 | 0.6 | 0.8 |

| | | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Low-density polyethylene (A) | MFR | g/10 min | 22 | 22 | 60 | 0.5 | 22 | 22 |
| | Amount | part by weight | 0.03 | 6.0 | 1.0 | 1.0 | 1.0 | 1.0 |
| Fatty acid Compound (B-1) | Amount | part by weight | 0.3 | 0.3 | 0.3 | 0.3 | | |
| Fatty acid Compound (B-2) | | part by weight | | | | | | |
| Fatty acid Compound (B-3) | Amount | part by weight | | | | | 0.3 | |
| Layered double hydroxide (C) | Amount | part by weight | 0.01 | 0.01 | 0.01 | 0.01 | 0.01 | 0.01 |
| Pellet MFR | | g/10 min | 2.5 | 2.5 | 2.5 | 2.5 | 2.5 | 2.5 |
| Degree of whitening | | Appearance Evaluation 1-4 | 4 | 1 | 3 | 3 | 1 | 1 |
| Undulation unevenness | | μm | 5 | 17 | 7 | 9 | 11 | 15 |
| ΔMFR before and after extrusion | | g/10 min. | 1.4 | 0.3 | 0.6 | 0.5 | 0.6 | 0.7 |

| | | | | Comp. Ex. 7 | Comp. Ex. 8 | Comp. Ex. 9 | Comp. Ex. 10 |
|---|---|---|---|---|---|---|---|
| | Low-density polyethylene (A) | MFR | g/10 min | | | | 22 |
| | | Amount | part by weight | | | | 10 |
| | Fatty acid Compound (B-1) | Amount | part by weight | 0.3 | | | 0.3 |
| | Fatty acid Compound (B-2) | | part by weight | | 0.3 | | |
| | Fatty acid Compound (B-3) | Amount | part by weight | | | 0.3 | |
| | Layered double hydroxide (C) | Amount | part by weight | 0.01 | 0.01 | 0.01 | |
| | Pellet MFR | | g/10 min | 2.5 | 2.5 | 2.5 | 2.5 |
| | Degree of whitening | | Appearance Evaluation 1-4 | 4 | 4 | 4 | 1 |
| | Undulation unevenness | | μm | 6 | 8 | 12 | 4 |
| | ΔMFR before and after extrusion | | g/10 min. | 0.4 | 0.4 | 0.7 | 2.0 |

In Table 1, "Pellet MFR" indicates the melt flow rate (g/10 minutes) of the pellets of a polyacetal resin composition, which is measured in accordance with ISO1133 Standards, at 190° C. under a load of 2.16 kg.

With regard to the "Degree of whitening," the site around the center in the length direction of the produced round bar molded product was cut at right angles to the length direction, and the degree of whitening in the center of the cut cross-section was then observed by visual inspection. The degree of whitening was evaluated according to the following four-grade evaluation. 1: whitening cannot be observed; 2: whitening can be slightly observed; 3: whitening can be observed; and 4: whitening can be significantly observed. When the "Degree of whitening" is 1 or 2, appearance is evaluated to be passed. In contrast, when the "Degree of whitening" is 3 or 4, appearance is evaluated to be failed. Specifically, the "Degree of whitening" that is 1 or 2 demonstrates that the problem regarding a white core has been overcome or reduced.

The "Undulation unevenness" was evaluated by measuring the unevenness on the surface around the center in the length direction of the produced round bar molded product, using a surface roughness tester (the three-dimensional shape measuring machine, SURFCOM, manufactured by KEYENCE CORPORATION), under the following conditions: "contour measurement mode, measurement distance: 40 mm, measurement speed: 1.5 mm/sec, and measurement position: random," and then evaluating it based on the maximum depth (maximum value) of the unevenness. When the "Undulation unevenness" was 10 μm or less, it was evaluated to be passed. That is to say, it demonstrates that if the "Undulation unevenness" is 10 μm or less, the problem of undulation unevenness generated on the surface has been overcome or reduced.

The "ΔMFR before and after extrusion" is a value (g/10 minutes) obtained by subtracting the melt flow rate of the pellets of a polyacetal resin composition (pellet MFR) from the melt flow rate of a round bar molded product, which is measured in accordance with ISO1133 Standards, at 190° C. under a load of 2.16 kg. When the "ΔMFR before and after extrusion" was 1.0 g/10 minutes or less, it was evaluated to be passed. That is to say, it demonstrates that if the "ΔMFR before and after extrusion" is 1.0 g/10 minutes or less, the problem regarding viscosity reduction has been overcome or reduced.

The round bar molded products of Examples 1 to 13 had a degree of whitening of 1 or 2 (passed), an undulation unevenness of 3 to 9 μm (passed), and ΔMFR before and after extrusion of 0.2 to 0.9 g/10 minutes (passed). That is, in Examples 1 to 13, all of the degree of whitening, undulation unevenness, and ΔMFR before and after extrusion were evaluated to be passed, and thus, all of the problems regarding viscosity reduction, a white core, and undulation unevenness generated on the surface could be overcome or reduced.

On the other hand, Comparative Example 1 had a degree of whitening of 4 (failed) and ΔMFR before and after extrusion of 1.4 g/10 minutes (failed), Comparative Example 2 had an undulation unevenness of 17 μm (failed), and Comparative Examples 3 and 4 had a degree of whitening of 3 (failed). Comparative Example 5 had an undulation unevenness of 11 μm (failed). Comparative Example 6 that did not comprise the additive (B) had an undulation unevenness of 15 μm (failed), Comparative Examples 7 to 9 that did not comprise the additive (A) had a degree of whitening of 4 (failed), and Comparative Example 10 that did not comprise the additive (C) had ΔMFR before and after extrusion of 2.0 g/10 minutes (failed). That is, Comparative Examples 1 to 10 were evaluated to be failed in terms of one or more of the degree of whitening, undulation unevenness, and ΔMFR before and after extrusion, and thus, the problems regarding viscosity reduction, a white core, and undulation unevenness generated on the surface have still remained.

The invention claimed is:

1. A polyacetal resin composition consisting of a polyacetal resin and the following (A), (B), (C) and (D) with respect to 100 parts by weight of the polyacetal resin:
   (A) 0.05 to 5.5 parts by weight of a low-density polyethylene having a melt flow rate of 1.0 to 50 g/10 minutes (190° C., 2.16 kg),
   (B) 0.05 to 2.0 parts by weight of a fatty acid compound (excluding calcium stearate),
   (C) 0.001 to 1.0 part by weight of hydrotalcite, and
   (D) 0.01 to 5.0 parts by weight of a sterically hindered phenol and/or a nitrogen-containing compound;
   wherein
   the polyacetal resin is prepared by a method that consists of copolymerizing a cyclic acetal comprising an oxymethylene group with a cyclic acetal comprising an oxyalkylene group containing 2 to 5 carbon atoms, and
   the fatty acid compound is a fatty acid ester, a fatty acid amide, or a combination thereof.

2. The polyacetal resin composition according to claim 1, wherein the cyclic acetal comprising an oxymethylene group is selected from the group consisting of trioxane and tetraoxane, and the cyclic acetal comprising an oxyalkylene group containing 2 to 5 carbon atoms is selected from the group consisting of ethylene oxide, 1,3-dioxolane, 1,3,6-trioxocane and 1,3-dioxepane.

* * * * *